(12) United States Patent
Nobuyasu et al.

(10) Patent No.: US 11,215,274 B2
(45) Date of Patent: Jan. 4, 2022

(54) LUBRICATION MECHANISM FOR VEHICLE DRIVE-FORCE TRANSMITTING APPARATUS

(71) Applicant: TOYOTA JIDOSHA KABUSHIKI KAISHA, Toyota (JP)

(72) Inventors: Seitaro Nobuyasu, Okazaki (JP); Yu Hirai, Toyota (JP); Atsushi Kawamoto, Toyota (JP); Shigetsugu Iwata, Toyota (JP); Yuki Katayama, Toyota (JP); Kazuaki Kamiya, Toki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 16/820,765

(22) Filed: Mar. 17, 2020

(65) Prior Publication Data
US 2020/0332881 A1 Oct. 22, 2020

(30) Foreign Application Priority Data
Apr. 19, 2019 (JP) .............................. JP2019-080550

(51) Int. Cl.
*F16H 57/04* (2010.01)
*F16H 57/023* (2012.01)

(52) U.S. Cl.
CPC ....... *F16H 57/0424* (2013.01); *F16H 57/023* (2013.01); *F16H 57/0421* (2013.01); *F16H 57/0457* (2013.01); *F16H 57/0479* (2013.01)

(58) Field of Classification Search
None
See application file for complete search history.

(56) References Cited

U.S. PATENT DOCUMENTS

| | | | | |
|---|---|---|---|---|
| 3,065,822 A * | 11/1962 | Mcafee | ................... | B60R 17/00 184/6.12 |
| 5,989,143 A * | 11/1999 | Bell | ..................... | F16H 57/0421 184/11.2 |
| 8,109,174 B2 * | 2/2012 | Hilker | ................. | F16H 57/0483 74/606 A |
| 8,657,073 B2 * | 2/2014 | Matsumoto | ......... | F16H 57/0483 184/11.1 |

(Continued)

FOREIGN PATENT DOCUMENTS

JP 2015-209916 A 11/2015

*Primary Examiner* — Colby M Hansen
(74) *Attorney, Agent, or Firm* — Oblon, McClelland, Maier & Neustadt, L.L.P.

(57) ABSTRACT

A lubrication mechanism for a vehicle drive-force transmitting apparatus including; first and second gears meshing with each other in a meshing region; and a casing storing therein the first and second gears. The lubrication mechanism includes a gutter that extends from an inner wall surface such that oil is received in the gutter and is then dropped from an end of the gutter. The gutter includes a flow-direction changing rib with which the received oil is to be collided whereby a flow direction of the received oil is changed to a direction toward the end of the gutter. The end of the gutter is located on upper side of the meshing region, between first and second vertical planes containing respective first and second axes about which the first and second gears to be rotated, and is located between opposite ends of the meshing region.

9 Claims, 5 Drawing Sheets

(56) References Cited

U.S. PATENT DOCUMENTS 8,905,885 B2 * 12/2014 Yamamoto ............... B60K 6/26
                                                     475/159
8,919,500 B1 * 12/2014 Kilcrease ................. F01M 9/10
                                                     184/6.12

* cited by examiner

LUBRICATION MECHANISM FOR VEHICLE DRIVE-FORCE TRANSMITTING APPARATUS

This application claims priority from Japanese Patent Application No. 2019-080550 filed on Apr. 19, 2019, the disclosure of which is herein incorporated by reference in its entirety.

FIELD OF THE INVENTION

The present invention relates to a lubrication mechanism that is to be provided in a drive-force transmitting apparatus installed in a vehicle, and more particularly, to techniques for providing a sufficient rate of supply of oil to gears meshing with each other.

BACKGROUND OF THE INVENTION

In recent years, there is a tendency, in a vehicle drive-force transmitting apparatus, that a pressure applied to tooth surfaces of gears as drive-force transmitting members and a sliding speed of the tooth surfaces of the gears tend to be increased as results of increase of torque transmitted in the drive-force transmitting apparatus and increase of rotational speeds of the drive-force transmitting members. The increased sliding speed of the gear tooth surfaces and the increased pressure applied to the gear tooth surfaces are likely to increase temperature of the gear tooth surfaces and consequently to cause damage such as so-called "pitting" in the gear tooth surfaces. Therefore, it is desired that the gear tooth surfaces are cooled by oil, particularly, during forward running of the vehicle. In connection with such an issue, in JP-2015-209916A, it is proposed that oil scooped up by a scooping-up gear is moved from a surface of a shaft of a gear to a surface of teeth of the gear so that the oil scooped up by the scooping-up gear is supplied to the tooth surface of the gear.

SUMMARY OF THE INVENTION

By the way, in the arrangement disclosed in the above-identified Japanese Patent Application Publication, during forward running of the vehicle, since the gear is rotated, the oil is moved along side surface of a tooth portion of the gear and is scattered radially outwardly from the gear due to a centrifugal force. Thus, there is a problem that it is difficult to provide a sufficient amount or rate of supply of the oil to the tooth surface of the gear.

The present invention was made in view of the background art described above. It is therefore an object of the present invention to provide a lubrication mechanism that is to be provided in a drive-force transmitting apparatus installed in a vehicle, wherein the lubrication mechanism is capable of providing a sufficient amount or rate of supply of oil to tooth surface of a gear in the drive-force transmitting apparatus, for example, during forward running of the vehicle.

The above object is achieved according to the following aspects of the present invention.

According to a first aspect of the invention, there is provided a lubrication mechanism that is to be provided in a drive-force transmitting apparatus installed in a vehicle, the drive-force transmitting apparatus including: a first gear rotatable about a first axis; a second gear rotatable about a second axis parallel to the first axis and meshing with the first gear in a meshing region; and a casing storing therein the first and second gears, the lubrication mechanism comprising a gutter that extends from an inner wall surface of the casing in an axial direction parallel to the first and second axes, such that oil scooped up, for example, during forward running of the vehicle by which the first and second gears are rotated in respective directions, is received in the gutter and is then dropped from an end of the gutter, wherein the gutter includes a flow-direction changing rib with which the received oil is to be collided whereby a flow direction of the received oil is changed to a direction toward the end of the gutter, and wherein the end of the gutter is located in a given position, the given position being located on upper side of the meshing region in a vertical direction, the given position being located between a first vertical plane parallel to the vertical direction and containing the first axis and a second vertical plane parallel to the vertical direction and containing the second axis, the given position being located between opposite ends, which are opposite to each other in the axial direction, of the meshing region in the axial direction. For example, the above-described end of the gutter may be a distal end, in the axial direction, of the gutter that extends from the inner wall surface of the casing in the axial direction. Further, the distal end of the gutter may be opposed, in the vertical direction, to an upstream side portion of an outer circumferential surface of one of the first and second gears, wherein the upstream side portion is located on an upstream side of the meshing region in a direction of rotation of the one of the first and second gears.

According to a second aspect of the invention, in the lubrication mechanism according to the first aspect of the invention, the gutter includes, in addition to the flow-direction changing rib, a guide rib configured to guide the oil received in the gutter, toward the flow-direction changing rib, wherein the guide rib and the flow-direction changing rib have respective lower ends in the vertical direction, such that the lower end of the guide rib and the lower end of the flow-direction changing rib are connected to each other. For example, the first axis may be located on an upper side of the second axis in the vertical direction, wherein the guide rib is located between the first and second vertical planes, and is located on an upper side of the first axis in the vertical direction, and wherein the guide rib is inclined with respect to a horizontal direction that is perpendicular to the first and second vertical planes, such that a first-vertical-plane-side end of the guide rib is located on an upper side of a second-vertical-plane-side end of the guide rib in the vertical direction, the first-vertical-plane-side end of the guide rib being located to be closer to the first vertical plane than the second-vertical-plane-side end of the guide rib, the second-vertical-plane-side end of the guide rib being located to be closer to the second vertical plane than the first-vertical-plane-side end of the guide rib.

According to a third aspect of the invention, in the lubrication mechanism according to the second aspect of the invention, the guide rib and the flow-direction changing rib have respective lengths measured in the axial direction parallel to the first and second axes, such that the length of the flow-direction changing rib is larger than the length of the guide rib.

According to a fourth aspect of the invention, in the lubrication mechanism according to any one of the first through third aspects of the invention, the gutter has, in a lower surface in the vertical direction, a recessed portion that is recessed upwardly in the vertical direction.

According to a fifth aspect of the invention, in the lubrication mechanism according to any one of the second through fourth aspects of the invention, there is further provided an opposed wall which is provided on an upper side of the gutter in the vertical direction and which is opposed to the gutter, wherein the opposed wall and the gutter cooperate with each other to define a gap between the opposed wall and the gutter, such that the oil scooped up during the rotations of the first and second gears is received in the gutter through the gap, and wherein the flow-direction changing rib is connected, at an upper end thereof, with the opposed wall.

In the lubrication mechanism according to the first aspect of the invention, the oil scooped up, for example, during forward running of the vehicle by which the first and second gears are rotated in respective directions, is received in the gutter and is then collided with the flow-direction changing rib whereby the flow direction of the oil is changed to the direction toward the end of the gutter from which the oil is to be dropped. Thus, the oil is supplied to the meshing region (in which the first and second gear mesh with each other) through the gutter, whereby the oil can be supplied to tooth surfaces of the gears at a sufficient rate. Consequently, it is possible to restrain increase of temperature of the gear tooth surfaces, and accordingly to restrain damage of the gear tooth surfaces due to the increase of temperature of the gear tooth surfaces.

In the lubrication mechanism according to the second aspect of the invention, the gutter includes the flow-direction changing rib and the guide rib. The guide rib is configured to guide the oil received in the gutter, toward the flow-direction changing rib with which the oil is to be collided whereby a flow direction of the oil is changed to a direction toward the end of the gutter. Further, the lower end of the guide rib and the lower end of the flow-direction changing rib are connected to each other, whereby the guide rib and the flow-direction changing rib cooperate with each other to define a gutter shape, i.e., a V shape in cross section, by which the oil collided with the flow-direction changing rib is received, and whereby the oil can be caused to flow along the gutter.

In the lubrication mechanism according to the third aspect of the invention, the guide rib and the flow-direction changing rib have respective lengths measured in the axial direction parallel to the first and second axes, such that the length of the flow-direction changing rib is larger than the length of the guide rib, so that the oil received in the gutter and guided to the flow-direction changing rib can be efficiently caused to be collided with the flow-direction changing rib and caused to flow toward the end of the gutter.

In the lubrication mechanism according to the fourth aspect of the invention, the gutter has, in the lower surface in the vertical direction, the recessed portion that is recessed upwardly in the vertical direction, so that the oil having been moved to a distal end of the gutter or its vicinity can be separated from the lower surface of the gutter so as to be dropped from the distal end or its vicinity.

In the lubrication mechanism according to the fifth aspect of the invention, the opposed wall and the gutter cooperate with each other to define the gap between the opposed wall and the gutter, such that the oil that is scooped up, for example, during forward running of the vehicle by which the first and second gears are rotated in respective given directions, is received in the gutter through the gap, and the flow-direction changing rib is connected at the upper end thereof with the opposed wall, so that the oil received in the gutter through the gap is collided with the flow-direction changing rib without the oil flowing out through between the upper end of the flow-direction changing rib and the opposed wall whereby the oil is moved toward the end (e.g., distal end) of the gutter. Thus, the oil that is scooped up, for example, during forward running of the vehicle, can be efficiently guided to the end of the gutter. On the other hand, during reverse running of the vehicle by which the first and second gears are rotated in respective directions that are opposite to the above-described given directions, the oil is caused to flow in directions that are opposite to those during forward running of the vehicle, and the oil is blocked from flowing into the gap since the upper end of the flow-direction changing rib and the opposed wall are connected to each other. Therefore, during reverse running of the vehicle, it is possible to restrain increase of stirring resistance of the oil, which could be caused if the oil were excessively supplied to the meshing region through the gutter.

DETAILED DESCRIPTION OF PREFERRED EMBODIMENT

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

Embodiment

Figure 1:
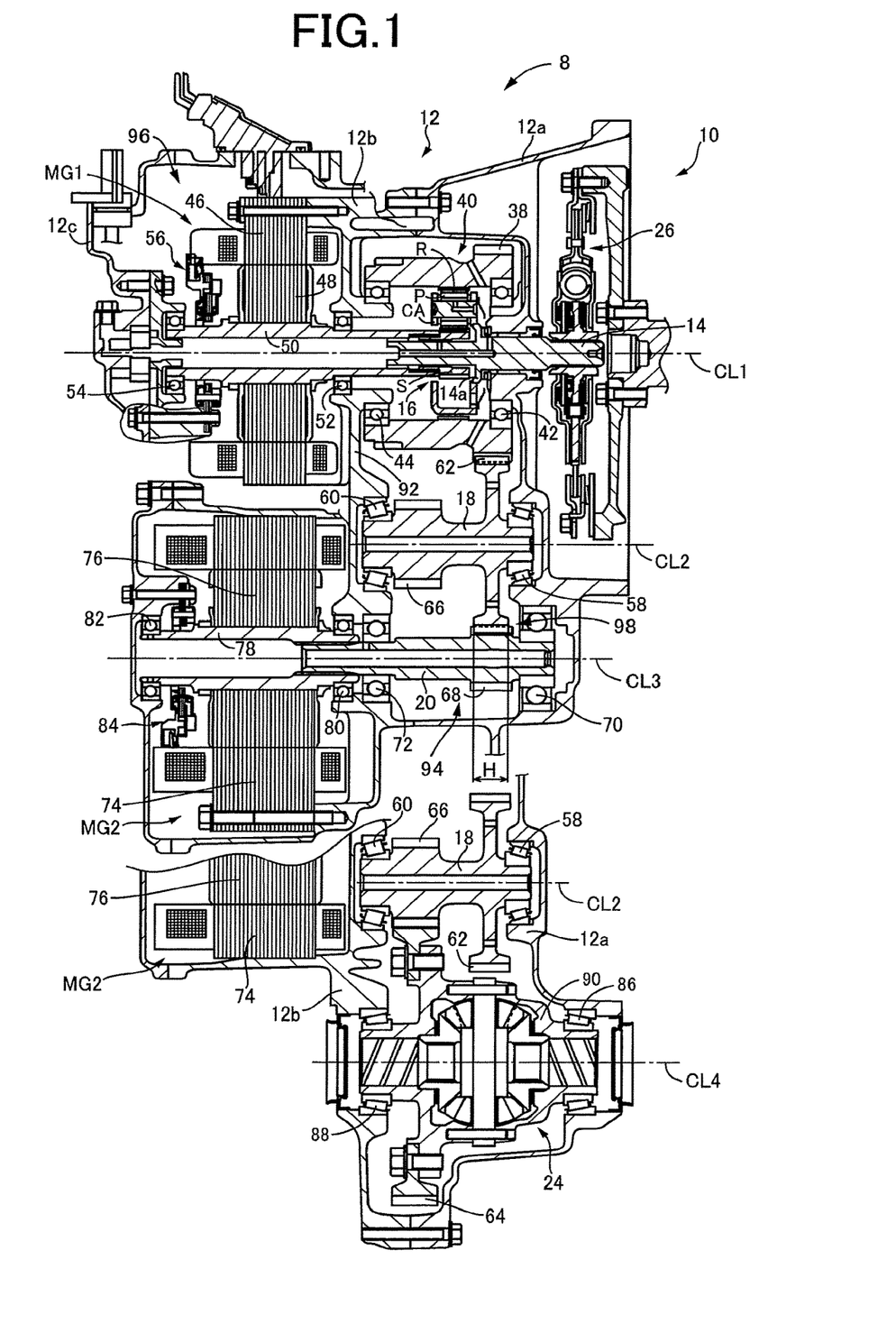
FIG. 1 is a cross sectional view of a drive-force transmitting apparatus for a hybrid vehicle, to which the present invention is applied.

FIG. 1 is a cross sectional view of a vehicle drive-force transmitting apparatus 10 for a hybrid vehicle 8, to which the present invention is applied. The drive-force transmitting apparatus 10 is of FF (front engine/front drive) system, and is to be driven by an engine (not shown) and/or a second electric motor MG2.

The drive-force transmitting apparatus 10 includes an input shaft 14, a drive-force distributing mechanism 16, a first electric motor MG1, a counter shaft 18, a reduction shaft 20, the above-described second electric motor MG2, a differential device 24 and a casing 12 that stores therein all of these components. The input shaft 14, drive-force distributing mechanism 16 and first electric motor MG1 are disposed on the first axis CL1. The counter shaft 18 is disposed on the second axis CL2. The reduction shaft 20 and second electric motor MG2 are disposed on the third axis CL3. The differential device 24 is disposed on the fourth axis CL4.

The input shaft 14, which is rotatable about the first axis CL1, is connected at its axial end portion (i.e, end portion in a direction of the first axis CL1) to the engine (not shown) through a damper device 26 in a drive-force transmittable manner. The input shaft 14 includes a radially-outwardly projecting flange portion 14a that is connected at its distal end with a carrier CA that constitutes a part of the drive-force distributing mechanism 16.

The drive-force distributing mechanism 16 is configured to distribute the drive force of the engine 12 into the first electric motor MG1 and drive wheels (not shown) of the vehicle 8. The drive-force distributing mechanism 16 is constituted by a planetary gear device of single-pinion type, and includes a sun gear S which is rotatable about the first axis CL1, a ring gear R from which the drive force is transmittable to the sun gear S through pinions P, and the above-described carrier CA which supports the pinions P such that each of the pinions P is rotatable about its axis and is revolvable about the first axis CL1.

The sun gear S of the drive-force distributing mechanism 16 is connected to the first electric motor MG1 in a drive-force transmittable manner. The carrier CA of the drive-force distributing mechanism 16 is connected to the flange portion 14a of the input shaft 14. The ring gear R is connected to a counter drive gear 38 that is connected to the drive wheels in a drive-force transmittable manner.

The ring gear R is integrally formed in an inner circumferential surface of a compound gear 40. The compound gear 40 is an annular-shaped gear, and is provided with the ring gear R and the counter drive gear 38 that are formed in its inner circumferential surface and its outer circumferential surface, respectively. The compound gear 40 is supported, at its axially opposite end portions that are opposite to each other in the direction of the first axis CL1, by bearings 42, 44, and is rotatable about the first axis CL1.

The first electric motor MG1 includes a non-rotary member in the form of a stator 46, a rotor 48 disposed on an inner peripheral side of the stator 46 and a rotor shaft 50 that is connected at its outer circumferential surface to an inner circumferential surface of the rotor 48.

The stator 46 has an annular shape, and is constituted by a plurality of steel plates or sheets that are laminated on each other. The stator 46 is fixed to the casing 12 through a plurality of bolts, so as to be unrotatable relative to the casing 12. The rotor 48 has an annular shape, and is constituted by a plurality of steel plates or sheets that are laminated on each other. The rotor 48 is fixed at its inner circumferential surface to the outer circumferential surface of the rotor shaft 50, so as to be unrotatable relative to the rotor shaft 50. The rotor shaft 50 is supported by bearings 52, 54, and is rotatable about the first axis CL1. The rotor shaft 50 is provided with a resolver 56 that is located on a side of the bearing 54 in the direction of the first axis CL1, and is configured to detect a rotational speed of the first electric motor MG1.

The counter shaft 18 is supported, at its axially opposite end portions that are opposite to each other in a direction of the second axis CL2, by bearings 58, 60, and is rotatable about the second axis CL2. The counter shaft 18 is provided with a counter driven gear 62 and a drive pinion gear 66 that mesh with the counter drive gear 38 and a differential ring gear 64 of the differential device 24, respectively. The counter driven gear 62 meshes with also a reduction gear 68 of the reduction shaft 20.

The reduction shaft 20 is supported, at its axially opposite end portions that are opposite each other in a direction of the third axis CL3, by bearings 70, 72, and is rotatable about the third axis CL3. The reduction shaft 20 is provided with the reduction gear 68 that meshes with the counter driven gear 62. The reduction shaft 20 is splined, at its axial end portion in the direction of the third axis CL3, to a rotor shaft 78 of the second electric motor MG2.

The second electric motor MG2 includes a non-rotary member in the form of a stator 74, a rotor 76 disposed on an inner peripheral side of the stator 74 and the above-described rotor shaft 78 that is connected at its outer circumferential surface to an inner circumferential surface of the rotor 76.

The stator 74 has an annular shape, and is constituted by a plurality of steel plates or sheets that are laminated on each other. The stator 74 is fixed to the casing 12 through a plurality of bolts, so as to be unrotatable relative to the casing 12. The rotor 76 has an annular shape, and is constituted by a plurality of steel plates or sheets that are laminated on each other. The rotor 76 is fixed at its inner circumferential surface to the outer circumferential surface of the rotor shaft 78, so as to be unrotatable relative to the rotor shaft 78. The rotor shaft 78 is supported by bearings 80, 82, and is rotatable about the third axis CL3. The rotor shaft 78 is provided with a resolver 84 that is located on a side of the bearing 82 in the direction of the third axis CL3, and is configured to detect a rotational speed of the second electric motor MG2.

The differential device 24 is a differential mechanism configured to transmit the drive force to right and left axles while allowing rotation of each of the axles relative to the other of the axles. The differential device 24 includes a differential casing 90 and the above-described differential ring gear 64. The differential casing 90 is supported, at its axially opposite end portions that are opposite to each other in a direction of the fourth axis CL4, by bearings 86, 88, and is rotatable about the fourth axis CL4. The differential ring gear 64 is connected to the differential casing 90, and meshes with the drive pinion gear 66. Since the differential device 24 is a known device, detailed descriptions of the construction and operation are not provided.

The casing 12, which is a non-rotary member, is constituted by three casing members in the form of a first casing member 12a, a second casing member 12b and a third casing member 12c. The first and second casing members 12a, 12b are fastened to each other through bolts, with a mating surface of the second casing member 12b being in close contact with a mating surface of the first casing member 12a. The second and third casing members 12b, 12c are fastened to each other through bolts, with another mating surface of the second casing member 12b being in close contact with a mating surface of the third casing member 12c.

The casing 12 includes a partition wall 92 by which an interior of the casing 12 is sectioned into a gear room 94 and a motor room 96, such that the drive-force distributing mechanism 16, counter shaft 18, reduction shaft 20 and differential device 24 are disposed in the gear room 94 while the first and second electric motors MG1, MG2 are disposed in the motor room 96. The partition wall 92 is provided to be perpendicular to the first through fourth axes CL1-CL4 (hereinafter simply referred to as "axes CL" unless they are to be distinguished from each other).

In a lower portion of the gear room 94, there is oil stored to lubricate various components of the drive-force transmitting apparatus 10 such as rotary members and bearings supporting the rotary members, such that the differential ring gear 64 is partially immersed in the oil stored in the lower portion of the gear room 94. Therefore, with rotation of the differential ring gear 64 during running of the vehicle 8, the stored oil is scooped up by the differential ring gear 64. The oil scooped up by the differential ring gear 64 is stirred by other gears such as the counter drive gear 38, counter driven gear 62 and reduction gear 68, so as to be scooped further upwardly.

Figure 2:
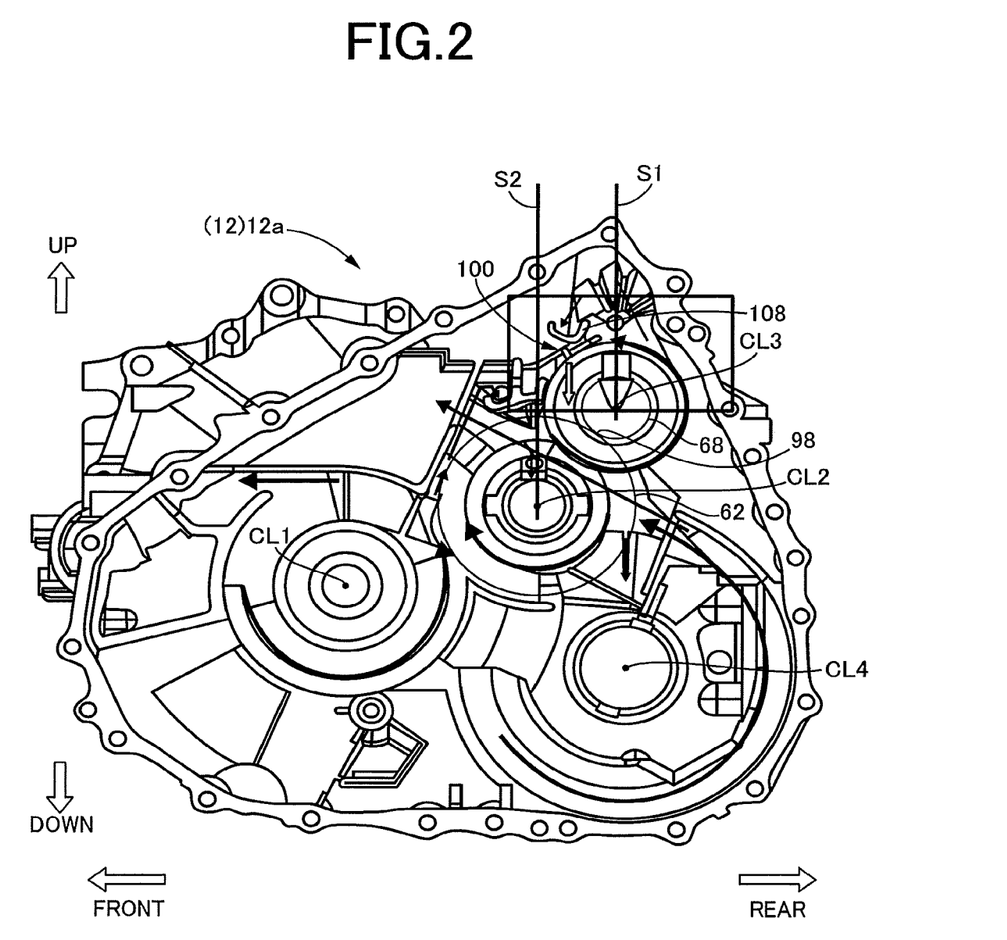
FIG. 2 is a view of interior of a casing of the drive-force transmitting apparatus of FIG. 1, as seen in an axial direction.

FIG. 2 is a view of interior of the first casing member 12*a* shown in FIG. 1, as seen in a direction of the axes CL (hereinafter referred to as "axial direction"). It is noted that FIG. 2 shows the interior of the first casing member 12*a* in an apparatus installed state in which the drive-force transmitting apparatus 10 is installed in the vehicle 8 and the vehicle 8 is on a flat horizontal road surface. In FIG. 2, a vertical direction in the drawing sheet corresponds to a vertical direction, a left side in the drawing sheet corresponds to a front side of the vehicle 8, and a right side in the drawing sheet corresponds to a rear side of the vehicle 8.

FIG. 2 shows arrows which indicate directions of flow of the oil stored in the gear room 94. As shown in FIG. 2, the counter driven gear 62 is rotatable about the second axis CL2 and the reduction gear 68 is rotatable about the third axis CL3. Further, although not shown in FIG. 2, the counter drive gear 38 is rotatable about the first axis CL1, the drive pinion gear 66 is rotatable about the second axis CL2 and the differential ring gear 64 is rotatable about the fourth axis CL4. With the gears (such as the counter drive gear 38, counter driven gear 62, differential ring gear 64, drive pinion gear 66 and reduction gear 68) being rotated, the oil stored in the gear room 94 is scooped up and scattered as indicated by the arrows (shown in FIG. 2) within the gear room 94. The scattered oil is supplied to various elements such as the gears and bearings within the gear room 94. The gear or gears configured to scoop up the oil constitute a part of a lubrication mechanism 102 that is configured to lubricate the rotary members, the bearings supporting the rotary members and other elements disposed in the gear room 94, by scooping up the oil stored in the casing 12. It is noted that, in FIG. 2, two circles denoted by reference signs "62", "68", respectively, represent pitch circles of the respective counter driven gear 62 and reduction gear 68, and a tangent to the two circles corresponds to a meshing position or region 98 in which the two gears 62, 68 mesh with each other.

By the way, the counter driven gear 62 rotated about the third axis CL3 and the reduction gear 68 rotated about the second axis CL2 mesh with each other in the meshing region 98 (see FIGS. 1, 2 and 5) in which a pressure applied to tooth surfaces of these gears 62, 68 and a sliding speed of the tooth surfaces of these gears 62, 68 are high, so that there is a risk that the gear tooth surfaces would suffer from damage such as so-called "pitting" due to increase of temperature of the gear tooth surfaces in the meshing region 98. Therefore, for restraining the damage of the gear tooth surfaces occurring in the meshing region 98, it is necessary to provide a sufficient rate of supply of the oil to the tooth surfaces of the counter driven gear 62 and the reduction gear 68 in the meshing region 98. Conventionally, the oil scooped up by the differential ring gear 64 and the oil moved from a wall surface of the first casing member 12*a* through the bearing 70 and the reduction shaft 20 have been supplied to the meshing region 98. However, the oil supplied to the meshing region 98 through the reduction shaft 20 has been scattered radially outwardly due to a centrifugal force because the reduction shaft 20 is rotated during forward running of the vehicle 8. Consequently, it has been difficult to supply the oil to the meshing region 98 at a sufficient rate. It is noted that the reduction gear 68 and the counter driven gear 62 correspond to "first gear" and "second gear" recited in the appended claims, respectively, and that the third axis CL3 corresponds to "first axis" recited in the appended claim. It is also noted that the above-described meshing region 98 has an axial length measured in the axial direction, wherein the axial length corresponds to an axial length, measured in the axial direction, of tooth portion of each of the counter driven gear 62 and the reduction gear 68 that mesh with each other, or corresponds to the axial length of the tooth portion of one of the counter driven gear 62 and the reduction gear 68 where the axial length of the tooth portion of the one of the two gears 62, 68 is smaller than that of the other of the two gears 62, 68.

For solving the above problem, in the present embodiment, the lubrication mechanism 102 includes a gutter 100 that is configured to guide the oil scooped up by the gears, to the meshing region 98 in which the counter driven gear 62 and the reduction gear 68 mesh with each other. As shown in FIG. 2, the gutter 100 is provided in a space that is located on an upper side of the meshing region 98 in the vertical direction in the apparatus installed state in which the drive-force transmitting apparatus 10 is installed in the vehicle 8. Further, the gutter 100 is located in a position between a first vertical plane S1 and a second vertical plane S2, as shown in FIG. 2, wherein the first vertical plane S1 contains the third axis CL3 and is parallel to the vertical direction while the second vertical plane S2 contains the second axis CL2 and is parallel to the vertical direction. The gutter 100 constitutes a part of the lubrication mechanism 102.

Figure 3:
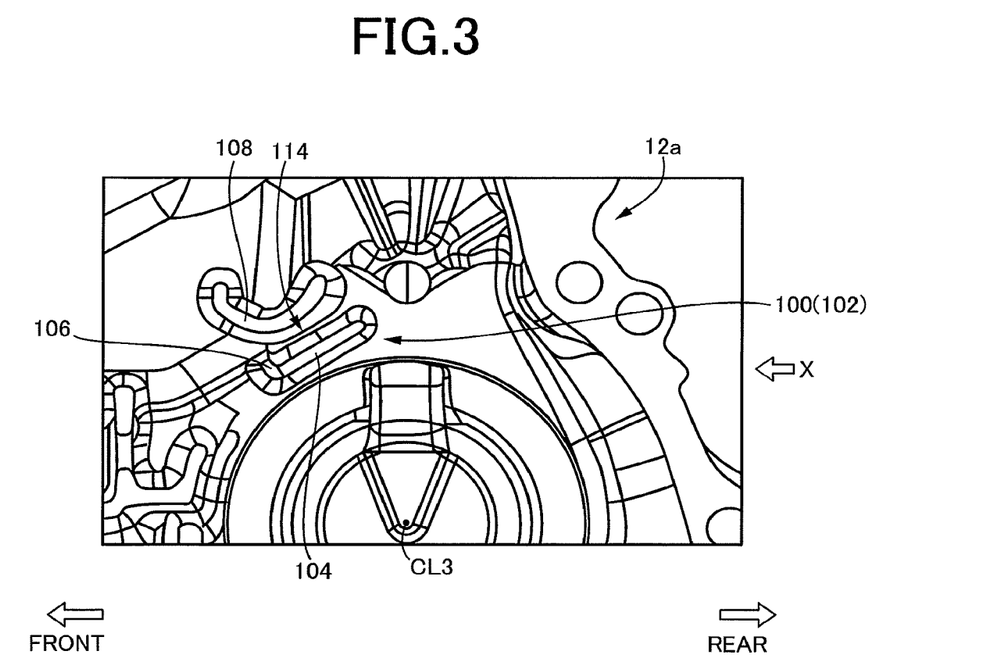
FIG. 3 is a view showing, in enlargement, a part surrounded by square line in FIG. 2, i.e., a part including a gutter and its periphery.

FIG. 3 is a view showing, in enlargement, a part surrounded by square line in FIG. 2, i.e., a part including the gutter 100 and its periphery.

As shown in FIG. 3, the gutter 100 has generally an L-shape as seen in the axial direction. The gutter 100 extends from a wall surface 110 (see FIG. 4) as an inner wall surface of the first casing member 12*a*, in the axial direction over a predetermined distance, as described below. The gutter 100 includes a first rib 104 and a second rib 106. The first rib 104 is inclined with respect to a horizontal direction that is perpendicular to the first and second vertical planes S1, S2, so as to extend upwardly as extending toward a rear side of the vehicle 8 (i.e, right side of the drawing sheet of FIG. 3). The second rib 106 is inclined with respect to the horizontal direction, so as to extend upwardly as extending toward a front side of the vehicle 8 (i.e, left side of the drawing sheet of FIG. 3). Thus, in the first rib 104, its front end portion is located on a lower side, in the vertical direction, of its rear end portion. Meanwhile, in the second rib 106, its rear end portion is located on a lower side, in the vertical direction, of its front end portion. That is, the first and second ribs 104, 106 are inclined with respect to the vertical direction. The front end portion of the first rib 104 corresponds to "lower end (of the guide rib)" recited in the appended claims. The rear end portion of the second rib 106 corresponds to "lower end (of the flow-direction changing rib)" recited in the appended claims. The rear end portion of the first rib 104 may be referred also to as "upper end of the first rib 104". The front end portion of the second rib 106 may be referred also to as "upper end of the second rib 106". Further, the first and second ribs 104, 106 correspond to "guide rib" and "flow-direction changing rib", respectively, which are recited in the appended claims.

The first rib 104 is formed to extend along the flow of the oil scooped up by the gears. The second rib 106 is formed to extend substantially perpendicularly to the direction of the flow of the oil scooped up by the gears. In other words, the first rib 104 as the guide rib is provided to guide the oil scooped up by the gears, and the second rib 106 as the flow-direction changing rib is provided to be collided with the oil scooped up by the gears.

Further, as shown in FIG. 3, the lower end (i.e., front end portion) of the first rib 104 and the lower end (i.e., rear end portion) of the second rib 106 are connected to each other, so that the gutter 100 has a gutter shape as a whole, which enables the gutter 100 to receive the oil that is scooped up by the gears during forward running of the vehicle 8. That is, with the first and second ribs 104, 106 being connected at their respective lower ends with each other, the gutter 100 has generally a V shape that protrudes downwardly.

On the upper side of the gutter 100 in the vertical direction, a U-shaped rib 108 is provided to be opposed to the gutter 100, as shown in FIG. 3. The U-shaped rib 108 and the gutter 100 cooperate with each other to define therebetween a gap 114 through which the oil is to pass. The gap 114 opens between the U-shaped rib 108 and the upper end of the first rib 104, i.e., the rear end portion of the first rib 104, so that the oil scooped up by the gears is to be received in the gutter 100 through this opening. The opening is located in a position that enables the oil scooped up by the gears during forward running of the vehicle 8, to flow through the gap 114 into the gutter 100. It is noted that the U-shaped rib 108 corresponds to "opposed wall" recited in the appended claims.

Further, the upper end of the second rib 106, i.e., the front end portion of the second rib 106, is connected to the U-shaped rib 108, so that the gap 114 is closed by the connection of the upper end of the second rib 106 with the U-shaped rib 108. Therefore, the oil flowing into the gap 114 though the opening defined between the upper end of the first rib 104 and the U-shaped rib 108, is collided with the second rib 106 whereby a direction of the flow of the oil is changed to a direction toward a distal end 115 (see FIG. 4) of the gutter 100.

Figure 4:
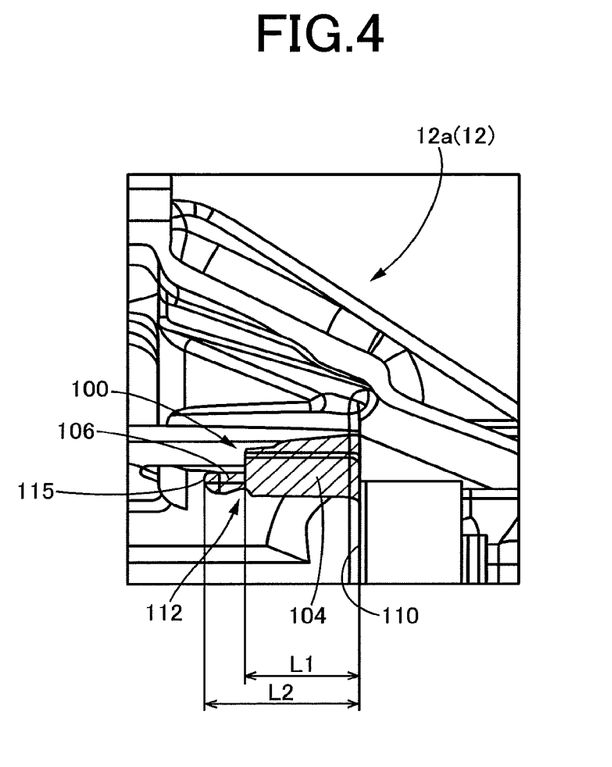
FIG. 4 is a view of the gutter as seen in a direction indicated by arrow X in FIG. 3.

FIG. 4 is a view of the gutter 100 as seen in a direction indicated by arrow X in FIG. 3, namely, as seen from the rear side of the vehicle 8. In FIG. 4, the gutter 100 is represented by hatched part. As shown in FIG. 4, each of the first and second ribs 104, 106 constituting the gutter 100 extends from the wall surface 110 of the first casing member 12a in the axial direction, i.e., in a direction perpendicular to the wall surface 110.

Further, in the gutter 100, a distal end of the first rib 104 and a distal end of the second rib 106 are located in respective different positions in the axial direction, as shown in FIG. 4. Specifically described, a distance from the wall surface 110 to the distal end of the second rib 106 is larger than a distance from the wall surface 110 to the distal end of the first rib 104 in the axial direction. That is, a length L2 of the second rib 106 in the axial direction is larger than a length L1 of the first rib 104 in the axial direction.

Further, the distal end 115 of the gutter 100 (corresponding to a distal end of the second rib 106) is located within a range L that is shown in FIG. 1, in the axial direction. This range L is an axial range in which teeth of the counter driven gear 62 and teeth of the reduction gear 68 overlap in a direction perpendicular to the axes CL in the meshing region 98. The range L corresponds to the above-described axial length of the meshing region 98. Therefore, when the oil is dripped or dropped from the distal end 115 or its vicinity of the gutter 100 in the axial direction, the dropped oil reaches down onto tooth surfaces of the counter driven gear 62 and the reduction gear 68 meshing with each other in the meshing region 98.

Further, as shown in FIG. 4, the gutter 100 has a recessed portion 112 in its connection portion in which the lower end of the first rib 104 and the lower end of the second rib 106 are connected with each other. The recessed portion 112 is provided in a lower surface, in the vertical direction, of the above-described connection portion of the gutter 100, and is recessed upwardly in the vertical direction. The recessed portion 112 is located in the vicinity of the distal end 115 of the gutter 100 in the axial direction. Each of the first and second ribs 104, 106 that constitute the gutter 100 is formed by a casting process. Thus, due to characteristics of the casting process, surfaces of each of the first and second ribs 104, 106 are not formed to be extend perpendicularly to the wall surface 110, but are formed be sloped such that thickness of each of the ribs 104, 106 is reduced in a direction away from the wall surface 110 toward the distal end of each of the ribs 104, 106. Therefore, even when the oil flowing in the gutter 100 has been moved to the distal end 115 of the gutter 100, the oil could be moved along the lower surface of the gutter 100 toward the wall surface 110, rather than being dropped from the distal end 115 or its vicinity. However, in the present embodiment, owing to the provision of the recessed portion 112 in the lower surface of the gutter 100, the oil moved to the distal end 115 of the gutter 100 is separated from the lower surface of the gutter 100 so as to be dropped from the distal end 115 or its vicinity. It is noted that the recessed portion 112 is formed by cutting the lower surface of the gutter 100 by using a cutting tool such as an endmill.

There will be described operation of the gutter 100 that is constructed as described above. As shown in FIG. 2, during forward running of the vehicle 8, the oil is scooped up by the gears in directions indicated by arrows, whereby the oil is caused to flow through the opening defined between the U-shaped rib 108 and the upper end of the first rib 104 of the gutter 100, into the gap 114 defined between the U-shaped rib 108 and the gutter 100. The oil introduced in the gap 114 is guided by the first rib 104 as the guide rib so as to be moved toward the second rib 106 as the flow-direction changing rib. In this instance, since the gap 114 is closed by the connection of the upper end of the second rib 106 with the U-shaped rib 108, the oil is caused to be collided with the second rib 106, without the oil passing through the gap 114. With the oil being collided with the second rib 106, a flow speed of the oil is reduced and a flow direction of the oil is changed to a direction parallel to the axial direction toward the distal end 115 of the gutter 100. Thus, the oil is guided by the gutter 100 so as to be moved toward the distal end 115.

Figure 5:
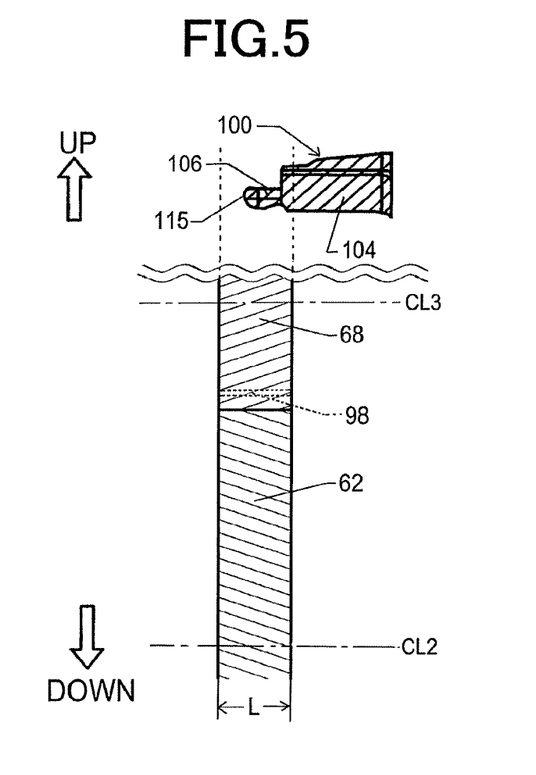
FIG. 5 is a view as seen in the direction indicated by the arrow X in FIG. 3, showing a positional relationship between the gutter and gears.

The distal end 115 of the gutter 100, i.e., an end of the gutter 100 from which the oil received in the gutter 100 is to be dropped, is located in a given position that is located on upper side of the meshing region 98 in the vertical direction and is located between the first vertical plane S1 containing the third axis CL3 and the second vertical plane S2 containing the second axis CL2. Further, as shown in FIG. 5, the given position of the distal end 115 of the gutter 100 is located within the range L corresponding to the meshing region 98, namely, is located between opposite ends, which are opposite to each other in the axial direction, of the meshing region 98 in the axial direction. In the present embodiment, the distal end 115 of the gutter 100 is located to be opposed, in the vertical direction, to an upstream side portion of an outer circumferential surface of the counter driven gear 62, wherein the upstream side portion is located on an upstream side of the meshing region 98 in a direction of rotation (i.e., clockwise direction as seen in FIG. 2) of the counter driven gear 62 during forward running of the vehicle 8, as shown in FIG. 2, so that the oil dropped from the distal end 115 or its vicinity of the gutter 100 is caused to reach down onto the upstream side portion of the outer circumferential surface of the counter driven gear 62, namely, is caused to reach down onto surfaces of teeth of the counter driven gear 62 or the reduction gear 68, which are about to mesh with teeth of the reduction gear 68 in the meshing region 98. Consequently, the temperature of the gear tooth surfaces are cooled down by the oil whereby the gear tooth surfaces are restrained from suffering from damage such as the pitting due to increase of temperature of the gear tooth surfaces in the meshing region 98. Thus, it is possible to provide a sufficient rate of supply of the oil to the tooth surfaces of the counter driven gear 62 and the reduction gear 68 in the meshing region 98, by the oil scooped up by the gears is received in the gutter 100 and is then dropped from the distal end 115 or its vicinity of the gutter 100 in the axial direction.

Further, owing to provision of the recessed portion 112 in the lower surface of the above-described connection portion (in which the lower end of the first rib 104 and the lower end of the second rib 106 are connected with each other) of the gutter 100, the vicinity of the distal end 115 of the gutter 100 is given a protruding shape protruding downwardly, so that the oil is dropped from the distal end 115 or from the vicinity of the distal end 115 having the downwardly protruding shape when the oil has been moved to the distal end 115. That is, the flow of the oil moved along the lower surface of the gutter 100 is interrupted by the recessed portion 112 provided in the lower surface of the above-described connection portion of the gutter 100, whereby the oil is separated from the lower surface of the gutter 100 so as to be dropped. The oil dropped from the distal end 115 or its vicinity of the gutter 100 is moved downwardly, as indicated by white arrow shown in FIG. 2, and reaches down onto the surfaces of teeth of one of the counter driven gear 62 and the reduction gear 68, which are about to mesh with teeth of the other of the two gears 62, 68 in the meshing region 98, so that increase of the temperature of the gear tooth surfaces is restrained.

On the other hand, during reverse running of the vehicle 8, each of the gears is rotated in a direction opposite to a direction of rotation of the gear during forward running of the vehicle 8, so that the oil is caused to flow in directions that are substantially opposite to those indicated by arrows shown in FIG. 2. Specifically, the oil is scattered or moved in clockwise direction, as seen in FIG. 2, about the third axis CL3 around the gutter 100. In this instance, the opening defined between the U-shaped rib 108 and the upper end of the first rib 104 is not opposed to the flow of the oil so that the oil is unlikely to flow into the gap 114 through the opening. Further, since the gap 114 is closed by the connection of the upper end of the second rib 106 with the U-shaped rib 108, the oil does not flow into the gap 114 through between the upper end of the second rib 106 with the U-shaped rib 108. Thus, during reverse running of the vehicle 8, the oil is unlikely to be received in the gutter 100, so that the amount of the oil supplied to the meshing region 98 through the gutter 100 is reduced. During reverse running of the vehicle 8, a required rate of supply of the oil for the lubrication is lower than during forward running of the vehicle 8, and stirring resistance of the oil would be increased if the oil were supplied at a rate higher than the required rate. In the present embodiment, during reverse running of the vehicle 8, the rate of supply of the oil to the meshing region 98 through the gutter 100 is reduced so that it is possible to restrain increase of the stirring resistance in the meshing region 98.

As described above, in the present embodiment, the oil scooped up during forward running of the vehicle 8 is received in the gutter 100 and is then collided with the second rib 106 whereby the flow direction of the oil is changed to the direction toward the distal end 115 of the gutter 100 from which the oil is to be dropped. Thus, the oil is supplied to the meshing region 98 (in which the reduction gear 68 and the counter driven gear 62 mesh with each other) through the gutter 100, whereby the oil can be supplied to tooth surfaces of the gears 68, 62 at a sufficient rate. Consequently, it is possible to restrain increase of temperature of the gear tooth surfaces, and accordingly to restrain damage of the gear tooth surfaces due to the increase of temperature of the gear tooth surfaces.

In the above-described embodiment, the gutter 100 includes the first and second ribs 104, 106. The first rib 104 is configured to guide the oil received in the gutter 100, toward the second rib 106 with which the oil is to be collided whereby a flow direction of the oil is changed to a direction toward the distal end 115 of the gutter 100.

In the above-described embodiment, the lower end of the first rib 104 and the lower end of the second rib 106 are connected to each other, whereby the first and second ribs 104, 106 cooperate with each other to define the gutter shape, i.e., the V shape in cross section, by which the oil collided with the second rib 106 is received, and whereby the oil can be caused to flow along the gutter 100.

In the above-described embodiment, the first and second ribs 104, 106 have the respective lengths L1, L2 measured in the axial direction, such that the length L2 of the second rib 106 is larger than the length L1 of the first rib 104, so that the oil received in the gutter 100 and guided to the second rib 106 can be efficiently caused to be collided with the second rib 106 and caused to flow toward the distal end 115 of the gutter 100.

In the above-described embodiment, the gutter 100 has, in the lower surface in the vertical direction, the recessed portion 112 that is recessed upwardly in the vertical direction, so that the oil having been moved to the distal end 115 of the gutter 100 or its vicinity can be separated from the lower surface of the gutter 100 so as to be dropped from the distal end or its vicinity.

In the above-described embodiment, the gutter 100 and the U-shaped rib 108 cooperate with each other to define the gap 114 therebetween, such that the oil that is scooped up during forward running of the vehicle 8 is received in the gutter 100 through the gap 114, and the second rib 106 is connected at its upper end with the U-shaped rib 108, so that the oil received in the gutter 100 through the gap 114 is collided with the second rib 106 without the oil flowing out through between the upper end of the second rib 106 and the U-shaped rib 108 whereby the oil is moved toward the distal end 115 of the gutter 100. Thus, the oil that is scooped up during forward running of the vehicle 8 can be efficiently guided to the distal end 115 of the gutter 100. On the other hand, during reverse running of the vehicle 8, the oil is caused to flow in directions that are opposite to those during forward running of the vehicle 8, and the oil is blocked from flowing into the gap 114 since the upper end of the second rib 106 and the U-shaped rib 108 is connected to each other. Therefore, during reverse running of the vehicle 8, it is possible to restrain increase of stirring resistance of the oil, which could be caused if the oil were excessively supplied to the meshing region 98 through the gutter 100.

While the preferred embodiment of this invention has been described in detail by reference to the drawings, it is to be understood that the invention may be otherwise embodied.

For example, in the above-described embodiment, the drive-force transmitting apparatus 10 is a drive-force transmitting apparatus of FF system having the four axes CL1-CL4. However, the present invention is applicable to any drive-force transmitting apparatus which includes first and second gears that mesh with each other in a casing of the drive-force transmitting apparatus.

In the above-described embodiment, the oil is supplied through the gutter 100 to the meshing region 98 in which the counter driven gear 62 and the reduction gear 68 mesh with each other. However, the meshing region 98 may be replaced by another meshing region in which other gears mesh with each other. That is, the present invention is applicable to any meshing region in which gear tooth surfaces could be problematically damaged.

In the above-described embodiment, the U-shaped rib 108 is provided on the upper side of the gutter 100 in the vertical direction such that the gap 114 is defined between the gutter 100 and the U-shaped rib 108. However, the U-shaped rib 108 may be replaced by a wall of the first casing member 12a or any other opposed wall which is provided on the upper side of the gutter 100 in the vertical direction and which is opposed to the gutter 100, as long as the opposed wall and the gutter 100 cooperate with other to define the gap 114 therebetween.

It is to be understood that the embodiment described above is given for illustrative purpose only, and that the present invention may be embodied with various modifications and improvements which may occur to those skilled in the art.

NOMENCLATURE OF ELEMENTS

10: vehicle drive-force transmitting apparatus
12: casing
62: counter driven gear (second gear)
68: reduction gear (first gear)
98: meshing region
100: gutter
102: lubrication mechanism
104: first rib (guide rib)
106: second rib (flow-direction changing rib)
108: U-shaped rib (opposed wall)
110: wall surface (inner wall surface)
112: recessed portion
114: gap
115: distal end (end)
CL2: second axis (second axis)
CL3: third axis (first axis)

What is claimed is:

1. A lubrication mechanism that is to be provided in a drive-force transmitting apparatus installed in a vehicle, the drive-force transmitting apparatus including; a first gear rotatable about a first axis; a second gear rotatable about a second axis parallel to the first axis and meshing with the first gear in a meshing region; and a casing storing therein the first and second gears,
the lubrication mechanism comprising a gutter that extends from an inner wall surface of the casing in an axial direction parallel to the first and second axes, such that oil scooped up during rotations of the first and second gears is received in the gutter and is then dropped from an end of the gutter,
wherein the gutter includes a flow-direction changing rib with which the received oil is to be collided whereby a flow direction of the received oil is changed to a direction toward the end of the gutter, and
wherein the end of the gutter is located in a given position, the given position being located on upper side of the meshing region in a vertical direction, the given position being located between a first vertical plane parallel to the vertical direction and containing the first axis and a second vertical plane parallel to the vertical direction and containing the second axis, the given position being located between opposite ends, which are opposite to each other in the axial direction, of the meshing region in the axial direction.

2. The lubrication mechanism according to claim 1,
wherein the gutter includes, in addition to the flow-direction changing rib, a guide rib configured to guide the oil received in the gutter, toward the flow-direction changing rib; and
the guide rib and the flow-direction changing rib have respective lower ends in the vertical direction, such that the lower end of the guide rib and the lower end of the flow-direction changing rib are connected to each other.

3. The lubrication mechanism according to claim 2,
wherein the guide rib and the flow-direction changing rib have respective lengths measured in the axial direction parallel to the first and second axes, such that the length of the flow-direction changing rib is larger than the length of the guide rib.

4. The lubrication mechanism according to claim 2, further comprising an opposed wall which is provided on an upper side of the gutter in the vertical direction and which is opposed to the gutter,
wherein the opposed wall and the gutter cooperate with each other to define a gap between the opposed wall and the gutter, such that the oil scooped up during the rotations of the first and second gears is received in the gutter through the gap, and
wherein the flow-direction changing rib is connected, at an upper end thereof, with the opposed wall.

5. The lubrication mechanism according to claim 2,
wherein the first axis is located on an upper side of the second axis in the vertical direction,
wherein the guide rib is located between the first and second vertical planes, and is located on an upper side of the first axis in the vertical direction, and
wherein the guide rib is inclined with respect to a horizontal direction that is perpendicular to the first and second vertical planes, such that a first-vertical-plane-side end of the guide rib is located on an upper side of a second-vertical-plane-side end of the guide rib in the vertical direction, the first-vertical-plane-side end of the guide rib being located to be closer to the first vertical plane than the second-vertical-plane-side end of the guide rib, the second-vertical-plane-side end of the guide rib being located to be closer to the second vertical plane than the first-vertical-plane-side end of the guide rib.

6. The lubrication mechanism according to claim 1,
wherein the gutter has, in a lower surface in the vertical direction, a recessed portion that is recessed upwardly in the vertical direction.

7. The lubrication mechanism according to claim 1,
wherein the end of the gutter is a distal end, in the axial direction, of the gutter that extends from the inner wall surface of the casing in the axial direction.

8. The lubrication mechanism according to claim 1,
wherein the end of the gutter is a distal end, in the axial direction, of the gutter that extends from the inner wall surface of the casing in the axial direction, and
wherein the distal end is opposed, in the vertical direction, to an upstream side portion of an outer circumferential surface of one of the first and second gears, the upstream side portion being located on an upstream side of the meshing region in a direction of rotation of the one of the first and second gears.

9. The lubrication mechanism according to claim 1, wherein the oil is scooped up and is received in the gutter during forward running of the vehicle by which the first and second gears are rotated in respective directions.

* * * * *